June 23, 1936.  C. B. HOUSE  2,044,944
AUTOMATIC BRAKE MECHANISM
Filed Oct. 19, 1934
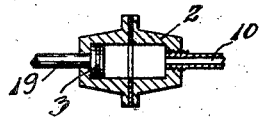
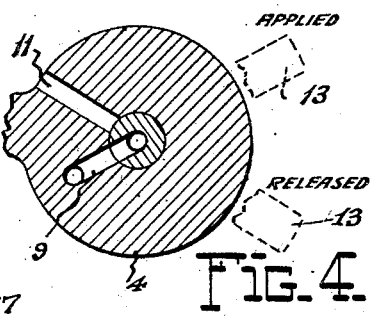
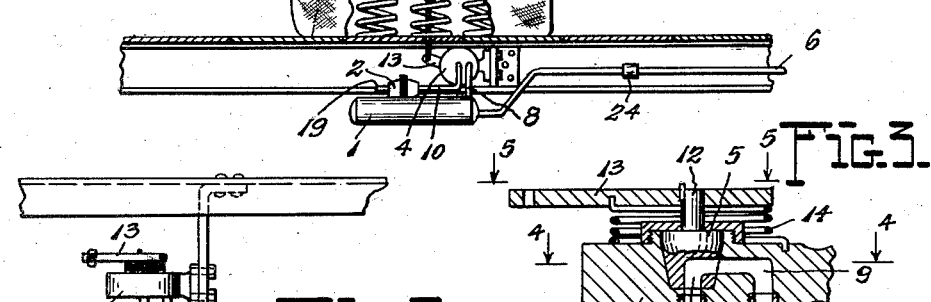
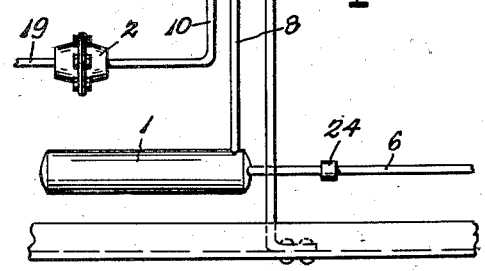
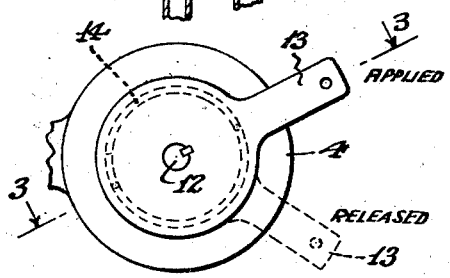
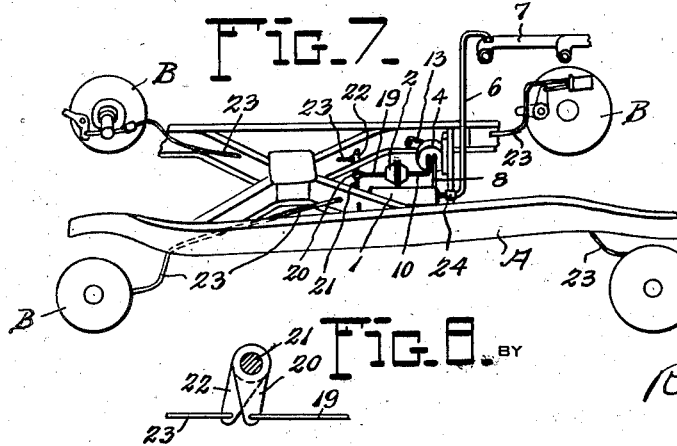
INVENTOR
*Charles B. House*
ATTORNEYS Patented June 23, 1936

2,044,944

UNITED STATES PATENT OFFICE 2,044,944

AUTOMATIC BRAKE MECHANISM

Charles B. House, Klamath Falls, Oreg.

Application October 19, 1934, Serial No. 749,108

5 Claims. (Cl. 188—109)

The present invention embodies certain improvements in emergency brake mechanisms for automobiles and similar vehicles. The object of the invention is to ensure the application of the emergency brakes of the vehicle under all conditions and occasions when the driver or operator of the vehicle leaves his seat or station at the steering wheel for any purpose.

In carrying out my invention it is applied, according to the disclosure hereinafter set forth, in connection with any ordinary type of vacuum brake system, but I wish it to be understood that the principles of the invention may be used in conjunction with other than this special type of vacuum brake system, as will be more fully apparent as this description proceeds.

The primary feature of novelty of this invention involves the control of the application of the emergency brake by mechanism carried within the seat upon which the driver or operator sits when controlling the vehicle. The said seat mechanism involves provisions whereby if the driver or operator leaves his seat the brakes of the car or automotive vehicle will be automatically set, thus avoiding all possibility of unauthorized movement of the vehicle should the driver leave his seat and by reason of forgetfulness fail to set his emergency brakes under conditions when these brakes should be applied for safety purposes.

The adaptation of my invention to the vacuum brake system method of applying emergency brakes is illustrated in the accompanying drawing, in which—

Figure 1 is a partial sectional view of the chassis of an automotive vehicle, and a partial sectional and side view of the seat for such vehicle at which the driver of the same will sit, the automatic means of the invention being shown cooperatively mounted in relation to the seat.

Figure 2 is a fragmentary top plan view showing certain of the control parts illustrated in Figure 1, the seat of the vehicle being omitted.

Figure 3 is a cross sectional view through the control valve, taken about on the line 3—3 of Figure 5.

Figure 4 is a vertical sectional view taken about on the line 4—4 of Figure 3.

Figure 5 is a view in elevation taken about on the line 5—5 of Figure 3 and looking in the direction of the arrows.

Figure 6 is a sectional view of the brake chamber containing the brake piston.

Figure 7 is a partial perspective view of the chassis of the vehicle, illustrating the general arrangement of parts exclusive of the automatic actuating means for the control valve, and the seat being also omitted.

Figure 8 is a detail view of a portion of the brake arms and brake rod connections.

I illustrate in Figure 7 in a somewhat fragmentary manner the chassis A of an automotive vehicle provided with the usual brake drums B for the front and rear wheels thereof. This chassis will carry in a suitable manner by the provision of supporting brackets and the like, the brake vacuum reservoir 1, the brake chamber 2 containing the usual piston 3, see Figure 6, the control valve casing 4 with the control valve 5 mounted therein, and associated parts. These associated parts include the pipe or conduit 6 leading to the intake manifold 7 whereby the suction at said manifold is adapted to create the vacuum desired in the reservoir 1. The reservoir 1 is connected by a pipe 8 to the valve casing 4, which casing 4 is equipped with a passage 9 for connecting the vacuum in the reservoir 1 through the pipe 8 to the pipe or conduit 10, the latter leading from the said passage 9 to the brake chamber 2. The valve casing 4 is also equipped with an atmospheric relief port 11. Generally speaking, the above parts may be parts of any ordinary brake system and my invention is shown adapted to such system merely as a preferred form thereof.

It is possible within the purview of my invention to apply the automatic mechanism thereof to a mechanical brake system or a hydraulic brake system.

My invention involves primarily the automatic operation of the brake control valve 5. This valve 5 has its stem or spindle 12 for the turning thereof provided with an operating arm 13 keyed or otherwise secured thereto.

A helical spring 14 is interlocked at one end with the valve casing 4 and at its opposite end with the arm 13, and the tendency of this spring is to hold the valve arm 13 in a position in which the valve 5 by its port 15 connects the vacuum conduit 9 to the atmosphere by the port 11. Under these conditions the vacuum pull on the piston 3 in the cylinder 2 is released and the brakes are correspondingly released so far as their cooperation with the brake drums 5 is concerned.

The seat 16 for the driver is equipped with the usual springs, one of which, designated 18, cooperates with an actuating member 17 controlling the automatic operation of the valve 5. The said actuating member 17 may be a cable length attached at its upper end to the upper end of the spring 18 and secured at its lower end to the arm 13. The tension of the spring 18 is greater than that of the spring 14 and will overcome therefore the tension of the latter.

When the driver is not seated at his post or station on the seat 16 as shown in Figure 1, the spring 18 will exert a pull upon the actuating member 17, raising the arm 13 against the tension of the spring 14 and thus causing the valve 5 to turn until the port 9 in the casing 4 is connected by the port 15 of the valve 5 with the conduit 10, and the action of the vacuum in the reservoir 1 acting upon the piston 3 in the cylinder 2 will cause the setting of the brakes in an obvious manner.

Of course when the driver resumes his position on the seat 16 his weight acting upon the spring 18 will compress it and relieve the tension on the actuating member 17, permitting the spring 14 to turn the valve 5 to cause the port 15 thereof to register with the port 11 as previously described.

The manner in which the brakes are controlled from the piston 3 in the brake chamber 2 is conventionally illustrated in the drawing in Figures 7 and 8 wherein it is to be seen that the piston rod 19 of the piston 3 is connected to a rocker arm 20 on a shaft 21 disposed transversely of the chassis A. The shaft 21 is equipped with another arm or arms 22 connected by brake rods 23 with the brake applying device at the drums B. Figure 5 is a view illustrating the positions assumed by the valve arm 13 which in its lower full line position adjusts the valve 5 to cause the application of the brakes and in the dotted line position affords an adjustment wherein the brakes are released.

In so far as the spring 14 is concerned, it is notable that this spring is arranged externally of the casing 4, but if desired, by providing a suitable space within the casing adjacent to the valve 5, said spring could be enclosed.

Summarizing the action of the control mechanism of my invention, it may be stated that I avail of a control device in the form of the valve 5 adapted to be operated to assume a position wherein it maintains the brakes of the vehicle released when the weight of the body of the operator of the vehicle while located at his driving station is caused to act upon said control device. On the other hand, when the weight of the body of said operator is no longer caused to act upon said control device, as for instance when the driver or operator of the vehicle reaches his driving station and gets out of the vehicle, the automatic instrumentalities previously set forth go into action to automatically apply the brakes. The pipe line 6 is equipped with the usual check valve 24.

While the brake mechanism of the present invention has been described in connection with a vacuum brake system, it is obvious that the same may be also employed in connection with compressed or straight air brake systems.

Having thus described my invention, what I claim as new and desire to secure by Letters Patent of the United States, is—

1. In brake mechanism of the class described, in combination, a seat constituting an operator's station, and on which the operator may be seated, brake applying and releasing mechanism, a control device for said brake applying and releasing mechanism, means for urging the control device to brake releasing position, flexible connecting means between the said seat and said control device whereby when the weight of the operator is received upon the seat the brake mechanism will be released, and means whereby when the weight of the operator is removed from the seat the said brake mechanism will be applied, the said connecting means extending from the control device to the seat and being operable to produce slack therein incident to compressive force upon the seat.

2. In brake mechanism of the class described, in combination, an operator's station having a seat including a spring member, brake applying and releasing mechanism, a control device for said brake applying and releasing mechanism, a connection between said control device and the seat whereby the spring of the seat when expanded will maintain the control device in a position causing setting of the brakes by said brake mechanism, and spring means coacting with the control device in opposition to the seat spring member but productive of less force than the seat spring member whereby, when the weight of the operator is received upon the seat and the spring thereof is compressed, the said control device will be shifted by the control device spring to cause release action of the brake applying and release mechanism.

3. In brake mechanism for automotive vehicles, the combination of a chassis, brakes carried thereby for the wheels with which the chassis may be equipped, pneumatic brake mechanism including a brake control valve movable to one position to cause application of brakes and movable to another position to cause release of the brakes, spring means for holding the said control valve in its brake setting position, and other spring means acting in opposition to the first mentioned spring means and productive of less force than the same for holding the said control valve in brake releasing position when the first mentioned spring means is actuated to render the same inoperative.

4. In brake mechanism for automotive vehicles, in combination, a chassis, brake devices for the wheels of the chassis, control mechanism including a control valve adjustable to cause release of the brakes and adjustable to cause application of the brakes, a seat for an operator at the driving station of the vehicle, including a spring adapted to receive the weight of the operator upon said seat, an actuating member intermediate the seat and said control valve such that when the weight of the operator is not carried by the seat the spring thereof may hold said actuating member in a position to adjust the control valve to a position wherein the brakes are set, said spring being compressible by the weight of the operator when received on the seat to render the said actuating member inactive, and other spring means cooperating with the control valve to shift the same to a brake releasing position when the weight of the operator is carried by the seat and compresses the spring of the latter.

5. In brake mechanism for automotive vehicles, the combination with a chassis, of brakes carried thereby for the wheels with which the chassis is equipped, brake mechanism for actuating the brakes and including a brake control valve movable to one position to cause application of the brakes and movable to another position to cause release of the brakes, and oppositely acting means for actuating the brake control valve, one of said actuating means dominating the other and arranged to be operated by the weight of the vehicle operator whereby removal of the weight of the operator causes the dominating means to actuate the brake control valve to brake applied position, and application of the weight of the vehicle operator causes the other oppositely acting actuating means to actuate the brake control valve to brake release position.

CHARLES B. HOUSE.